United States Patent
Robb (10) Patent No.: US 8,453,971 B2
(45) Date of Patent: Jun. 4, 2013

(54) COMPOSITE STRUCTURE POWER DISTRIBUTION

(75) Inventor: Andrew M. Robb, Ravensdale, WA (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 13/530,957

(22) Filed: Jun. 22, 2012

(65) Prior Publication Data

US 2012/0279058 A1 Nov. 8, 2012

Related U.S. Application Data

(63) Continuation of application No. 12/393,695, filed on Feb. 26, 2009, now Pat. No. 8,231,080.

(51) Int. Cl.
*B64C 1/00* (2006.01)

(52) U.S. Cl.
USPC .......................................................... 244/119

(58) Field of Classification Search
USPC   244/1 A, 119, 120, 133; 361/218; 428/300.7, 428/301.1
See application file for complete search history.

(56) References Cited

U.S. PATENT DOCUMENTS

| | | | |
|---|---|---|---|
| 7,236,343 B2 | 6/2007 | Heidlebaugh et al. |
| 7,307,825 B2 | 12/2007 | De La Fuente De Ana et al. |
| 7,864,501 B2 | 1/2011 | Rawlings et al. |
| 7,867,621 B2 | 1/2011 | Rawlings et al. |
| 8,231,080 B2 | 7/2012 | Robb |
| 2006/0060690 A1 | 3/2006 | Aisenbrey |
| 2009/0001217 A1 | 1/2009 | Dufresne et al. |
| 2011/0114895 A1 | 5/2011 | Lengsfeld |

FOREIGN PATENT DOCUMENTS

| | | |
|---|---|---|
| EP | 1569303 A1 | 8/2005 |
| EP | 1935784 A2 | 6/2008 |
| EP | 1935784 A3 | 10/2009 |

*Primary Examiner* — Timothy D Collins
*Assistant Examiner* — Nicholas McFall
(74) *Attorney, Agent, or Firm* — Toler Law Group, PC (57) ABSTRACT

A particular method includes exposing a plurality of fibers of a composite skin of an aircraft component by providing an opening in a layer of a first resin overlaying the plurality of fibers at an interior surface of the composite skin. The method also includes bonding a conductive patch in electrical contact with the plurality of fibers of the composite skin at the opening using a second resin. The method further includes preparing the aircraft component to receive a connector in electrical contact with the conductive patch.

20 Claims, 6 Drawing Sheets

COMPOSITE STRUCTURE POWER DISTRIBUTION

CLAIM OF PRIORITY

This application is a continuation patent application of, and claims priority from U.S. patent application Ser. No. 12/393,695, filed on Feb. 26, 2009, now issued as U.S. Pat. No. 8,231,080, and entitled "DISTRIBUTING POWER IN SYSTEMS HAVING A COMPOSITE STRUCTURE" which is incorporated by reference herein in its entirety for all purposes.

FIELD OF THE DISCLOSURE

The present disclosure is generally related to composite structure power distribution.

BACKGROUND

Power distribution systems can add significant weight and complexity to any system. For example, the power distribution system of a large commercial aircraft may be a significant weight burden for the aircraft. Power distribution systems typically use at least two wires to supply power from a power source to a powered device: a first wire (or a powered wire) to send current from the power source to the powered device and a second wire (or a return wire) to receive return current from the powered device at the power source. Thus, the power distribution system includes the weight of both the power wire and the return wire. Besides the issue of the weight of the two or more wires, using two or more wires to distribute power has the additional concern of routing the wires. In an aircraft or other vehicle where conductive metals are the primary structure, a one-wire power distribution system can be used. For example, current may be sent from the power source to the powered device and returned to the power source via the conductive metal primary structure. In any case, for aircraft and other vehicles, wire routing can be a significant concern due to issues such as shielding the wires to avoid chafing and routing the wires in safe locations.

SUMMARY

Systems and methods to distribute power in systems having a composite structure are disclosed. In a particular embodiment, a method of distributing power in a system having a composite structure includes coupling a powered device to a power source via a conductor. The power source provides electrical current to the powered device via the conductor. The method also includes coupling the powered device to the power source through a composite structure via a patch that is in direct contact with fibers of the composite structure. The power source receives return current from the powered device via the composite structure.

In another particular embodiment, an aircraft includes a fuselage having a composite skin. The composite skin includes a first resin and a plurality of fibers. The fuselage also includes an expanded conductive patch bonded to an interior surface of the composite skin by a second resin. The expanded conductive patch is in electrical contact with the plurality of fibers. The fuselage also includes a connector in electrical contact with the expanded conductive patch.

In another particular embodiment, a system includes at least one composite layer comprising a first resin and a plurality of fibers. The system also includes an expanded conductive patch bonded to a first surface of the at least one composite layer by a second resin. The expanded conductive patch is in electrical contact with the plurality of fibers. The system further includes a connector in electrical contact with the expanded conductive patch.

DETAILED DESCRIPTION

The features, functions, and advantages that are discussed can be achieved independently in various embodiments disclosed herein or may be combined in yet other embodiments further details of which can be shown with reference to the following description and drawings.

Power distribution systems that enable routing return current via a composite structure are described. For example, a composite structural member, such as a composite skin of an aircraft, may be used to send return current from a powered device to a power source. Use of such power distribution systems may lead to significant weight reductions since no return wire or network of conductors is required. Such power distribution systems may also use less space than two wire systems (i.e., systems that use a return wire). Additionally, these power distribution systems may be less complex to install than power distribution systems that use a return wire because the return wire does not need to be routed or otherwise protected against chafing or other potential destructive influences.

Figure 1:
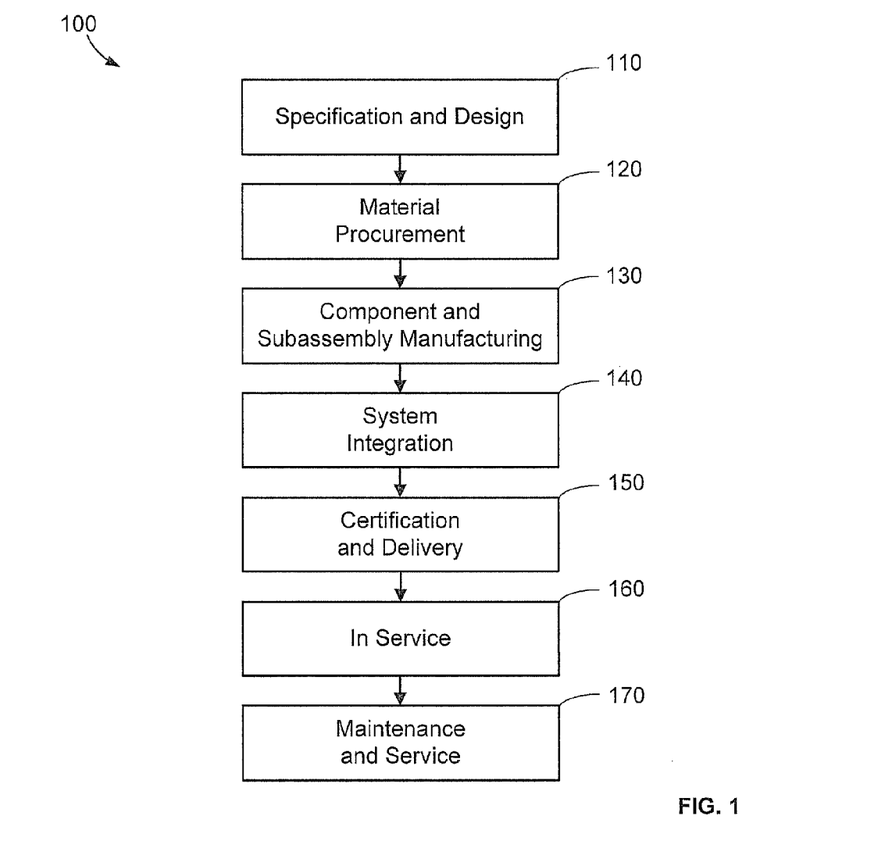
FIG. 1 is a flow diagram of an aircraft production and service methodology.
Figure 2:
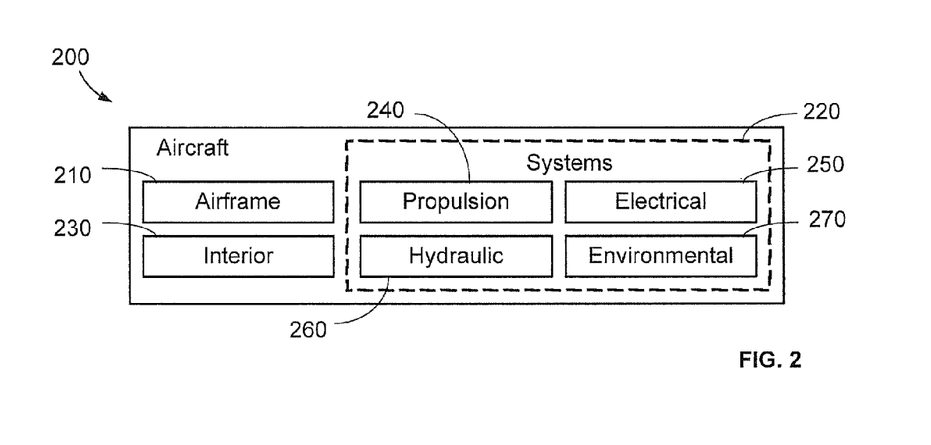
FIG. 2 is a block diagram of functional groups of aircraft systems.

Referring more particularly to the drawings, embodiments of the disclosure may be described in the context of an aircraft manufacturing and service method 100 as shown in FIG. 1 and functional aspects of an aircraft 200 as shown in FIG. 2. During pre-production, an exemplary method 100 may include specification and design 110 of the aircraft 200 and material procurement 120. During production, component and subassembly manufacturing 130 and system integration 140 of the aircraft 200 takes place. Thereafter, the aircraft 200 may go through certification and delivery 150 in order to be placed in service 160. While in service by a customer, the aircraft 200 is scheduled for routine maintenance and service 170 (which may also include modification, reconfiguration, refurbishment, and so on).

Each of the processes of the method 100 may be performed or carried out by a system integrator, a third party, and/or an operator (e.g., a customer). For the purposes of this description, a system integrator may include without limitation any number of aircraft manufacturers and major-system subcontractors; a third party may include without limitation any number of vendors, subcontractors, and suppliers; and an operator may be an airline, a leasing company, a military entity, a service organization, and so on.

As shown in FIG. 2, the aircraft 200 produced by the exemplary method 100 may include an airframe 210 with a plurality of systems 220 and an interior 230. Examples of high-level systems 220 include one or more of a propulsion system 240, an electrical system 250, a hydraulic system 260, and an environmental system 270. Any number of other systems may be included. Although an aerospace example is shown, the principles of the various embodiments may be applied to other industries, such as the automotive industry, the ship building industry or the wind power industry.

Apparatus and methods embodied herein may be employed during any one or more of the stages of the production and service method 100. For example, components or subassemblies corresponding to the component and subassembly manufacturing process 130 may be fabricated or manufactured in a manner similar to components or subassemblies produced while the aircraft 200 is in its in service phase 160. Also, one or more apparatus embodiments, method embodiments, or a combination thereof may be utilized during the production stages, such as the component and subassembly manufacturing stage 130 or the system integration stage 140, for example, by substantially expediting assembly of or reducing the cost of the aircraft 200. Similarly, one or more of the apparatus embodiments, the method embodiments, or a combination thereof may be utilized while the aircraft 200 is in service, for example and without limitation, during the maintenance and service stage 170.

Figure 3:
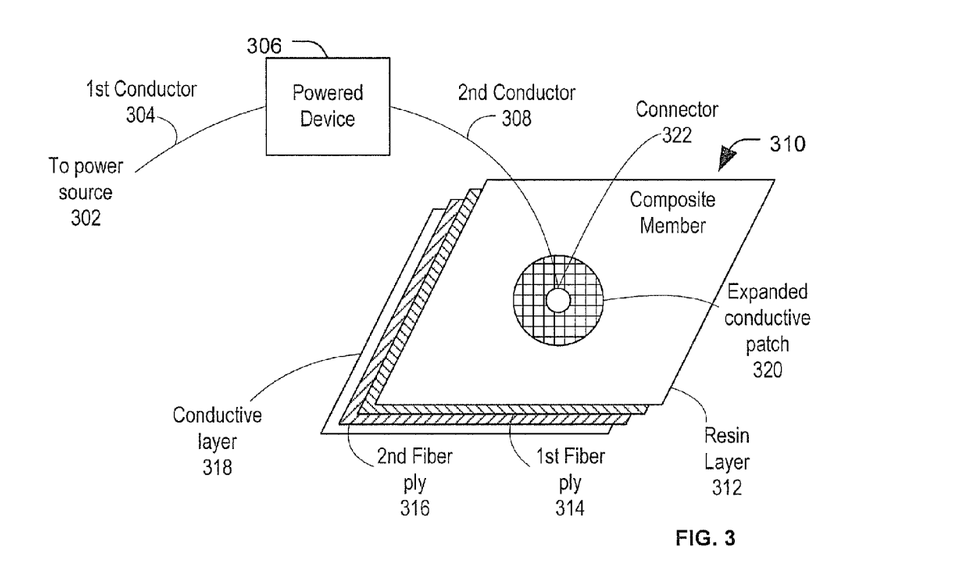
FIG. 3 is an illustration of a first embodiment of a system to distribute power.

FIG. 3 is an illustration of a first embodiment of a system to distribute power. The system includes a powered device 306 coupled via a first conductor 304 to a power source 302. The powered device 306 is also coupled to a connector 322 supported by a conductive patch 320 on a composite member 310 via a second conductor 308. In a particular embodiment, the composite member 310 may be a panel or other member of an aircraft, such as the aircraft 200 of FIG. 2. In this embodiment, the powered device 306 may be an aircraft component that receives power from the power source 302 via the first conductor 304.

In a particular embodiment, the composite member 310 includes a plurality of fibers bound by one or more resins. For example, the composite member 310 may include a carbon fiber reinforced polymer (CFRP) member, a composite of non-carbon fibers (e.g., boron fibers, metal fibers, etc.) bound by a resin or other continuous medium. For purposes of illustration in FIG. 3, the composite member 310 is illustrated having a resin layer 312 and a plurality of fiber plies, including a first fiber ply 314 and a second fiber ply 316. However, the composite member 310 may include more than one resin, more than two fiber plies, fibers arranged in another manner, such as individual fibers, fiber mats, fiber cloth, and so forth. Additionally, while the resin layer 312 is shown in FIG. 3 at the surface of the composite member 310, a resin may bind the plurality of fibers throughout the composite member 310. For example, the resin may be a substantially continuous medium in which the fiber plies 314, 316 reside.

In a particular embodiment, the composite member 310 also has a conductive layer 318 applied to a surface of the composite member 310. For example, where the composite member 310 is a portion of the aircraft, e.g., a portion of an aircraft panel or structural member, the conductive layer 318 may include a lightning protection layer. In a particular illustrative embodiment, the conductive layer 318 may include a metal layer or a metal foil that substantially covers an entire surface of the composite member 310.

In a particular embodiment, the powered device 306 is coupled to the composite member 310 via the connector 322 of the conductive patch 320. In a particular embodiment, the conductive patch 320 includes an expanded conductive patch. Expanded, in this context, refers to having gaps or openings between portions of the patch. For example, an expanded conductive patch may include a mesh, a grid, or a fabric of conductive elements, a member having a plurality of holes or openings, another structure where individual conductive elements or portions of conductive elements are spaced apart, or any combination thereof. The openings enable the expanded conductive patch to be coupled to fibers of the first fiber ply 314 using a resin. To illustrate, the openings enable the resin to flow around or between the individual conductive elements (e.g., metal strands). Thus, when put under compaction the individual conductive elements may come into direct and intimate contact with the fibers of the structure immediately below (such as the first fiber ply 314). If a solid foil is used, the resin may pool beneath the foil and inhibit the foil from coming into direct and intimate contact with the fibers.

In an alternative embodiment, the conductive patch 320 is corrugated, channelized, or otherwise structured to allow the resin to flow out of the space between the fibers of the first fiber ply 314 and the conductive patch 320 to enable direct and intimate contact between the fibers and the conductive patch 320. To illustrate, the conductive patch 320 can be placed in direct contact with the fibers of the first fiber ply 314 and the resin can be applied over the conductive patch 320 to adhere the conductive patch 320 to the first fiber ply 314. In a particular embodiment, electrical current may flow from the conductive patch 320 to the conductive layer 318 via the fiber plies 314, 316. Additionally, some of the return current may flow along a length of the fibers of the fiber plies 314, 316 to the power source 302. In a particular embodiment, the power source 302 may be coupled via a second conductive patch (not shown) to the composite member 310 or to another composite member (not shown) near the power source 302. The composite member near the power source 302 may be in electrical contact with the conductive layer 318, the fiber plies 314, 316, or both. Accordingly, return current flow to the power source 302 is provided via the conductive patch 320.

In a particular embodiment, the conductive patch 320 is deposited directly onto the exposed fibers of the first fiber ply 314. For example, a metallic patch may be deposited onto the fibers by first exposing the fibers by chemical or physical removal of the resin and then applying a metal layer to the fibers. The metal layer may be deposited using chemical, physical or electrical processes, such as electrodepositing or electroplating, liquid or gaseous chemical deposition of metals, sputtering, plasma or arc spraying metal onto the fibers, or the like.

The second conductor 308 may be coupled to the expanded conductive patch 320 via the connector 322. For example, the connector 322 may include a threaded member physically coupled to the composite member 310 and in electrical contact with the expanded conductive patch 320. In a particular embodiment, the expanded conductive patch 320 enables return current to flow from the powered device 306 to the power source 302 via the fiber plies 314, 316. For example, electrical current supplied to the powered device 306 via the first conductor 304 may be returned to the power source 302 via the expanded conductive patch 320. The expanded conductive patch 320 may be in physical contact with the fibers of at least the first fiber ply 314.

Figure 4:
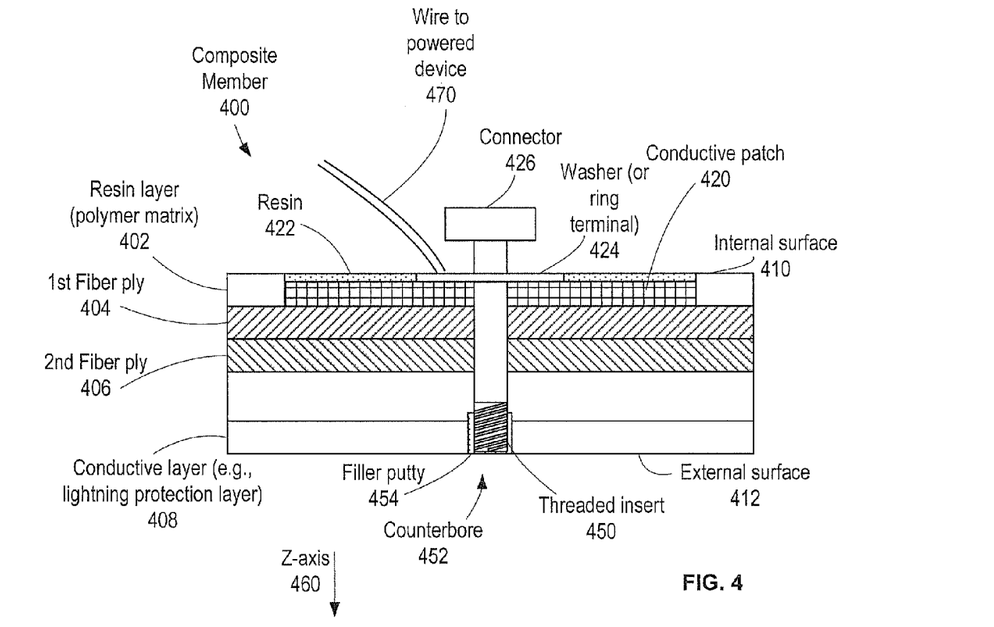
FIG. 4 is an illustration of a second embodiment of a system to distribute power.

FIG. 4 is an illustration of a second embodiment of a system to distribute power. The system illustrated in FIG. 4 includes a composite member 400. In a particular embodiment, the composite member 400 includes a skin or structural member of a vehicle having a composite construction. For example, the composite member 400 may include a panel, a structural member, or a fuselage segment of an aircraft, such as the aircraft 200 of FIG. 2.

The composite member 400 may include a plurality of fibers, such as a first fiber ply 404 and a second fiber ply 406, bound by a polymer matrix. In FIG. 4, the polymer matrix is illustrated as a resin layer 402; however, the polymer matrix may be at a surface or surfaces of the composite member, intermixed with the plurality of fibers, at other locations of the composite member 400, or any combination thereof. In a particular embodiment, the polymer matrix is a continuous medium and the fibers of the fiber plies 404, 406 are a discontinuous medium of the composite member 400. In a particular embodiment, the composite member 400 includes a conductive layer 408. For example, the conductive layer 408 may include a lightning protection layer of an aircraft. To illustrate, the composite member 400 may include an internal surface 410 on the inside of the aircraft and an external surface 412 on the outside of the aircraft. The external surface 412 may be covered by a substantially continuous metal conductive layer.

In a particular embodiment, the composite member 400 includes a conductive patch 420 at the internal surface 410. The conductive patch 420 may be electrically bonded to (e.g., in physical contact with) fibers of at least one of the fiber plies 404, 406. For example, the conductive patch 420 may rest on and be in physical contact with at least the first fiber ply 404. Additionally, the conductive patch 420 may be in electrical contact with a connector 426. The connector 426 may include a washer 424 to increase the electrical contact area with the conductive patch 420.

In a particular embodiment, the connector 426 may be coupled to the composite member 400 via a threaded insert 450. The threaded insert 450 may be inserted into a counterbore 452 through the external surface 412 of the composite member 400. In a particular embodiment, where it is desirable for the external surface 412 to be smooth, such as for the external surface of an aircraft, the counterbore 452 may be filled with a filler putty 454. The filler putty 454 may fill a gap between the counterbore 452 and the conductive layer 408 and may be substantially flush with the external surface 412. In this embodiment, the threaded insert 450 and the connector 426 may not have a direct electrical communication path to the conductive layer 408.

The conductive patch 420 may be coupled to the composite member 400 via a resin 422. The resin 422 may be applied over the conductive patch 420 to bond the conductive patch 420 to the plurality of fibers of the first fiber ply 404. In a particular embodiment, the conductive patch 420 includes a plurality of holes to allow the resin 422 to contact the first fiber ply 404 while the conductive patch 420 is also in electrical contact with the first fiber ply 404. In a particular embodiment, the conductive patch 420 includes an expanded metal patch. Expanded, in this context, indicates that portions of the conductive patch 420 are separated from one another in a manner that allows the resin 422 to couple to the first fiber ply 404 while the conductive patch 420 is also in contact with the first fiber ply 404. The expanded metal patch may include a metal mesh, metallic cloth, metal foil with a plurality of holes, or other structure that provides holes for the resin 422 to pass through to contact the plurality of fibers of the first fiber ply 404 when the conductive patch 420 is in direct contact with the plurality of fibers of the first fiber ply 404.

In a particular embodiment, the first fiber ply 404 and the second fiber ply 406 include boron fibers, carbon fibers, tungsten fibers or other fibers. The conductive patch 420 may be formed of a material that is galvanically compatible with the plurality of fibers of the fiber plies 404, 406, with the resin layer 402 and with the resin 422. For example, the conductive patch 420 may include copper, nickel, steel, another galvanically compatible metal or alloy, or any combination thereof.

A size of the conductive patch 420 may be selected based on an amount of current to be routed through the conductive patch 420. For example, the size of the conductive patch 420 may be related to a current density of the return current passing through the conductive patch 420 to the fibers of the fiber plies 404, 406. The current density may also be related to a temperature rise that occurs when the return current passes through conductive patch 420 to the fibers of the fiber plies 404, 406. In a particular embodiment, the size of the conductive patch 420 may be selected such that, during operation, a temperature change due to the return electrical current passing through the plurality of fibers of the first fiber ply 404 and the second fiber ply 406 via the conductive patch 420 does not cause a glass transition temperature of the resin layer 402 or of the resin 422 to be exceeded. For example, the size of the conductive patch 420 may be selected such that, during operation, a temperature change due to the return current passing through the plurality of fibers of the first fiber ply 404 and the second fiber ply 406 from the conductive patch 420 is less than about 20 degrees centigrade.

In a particular embodiment, return current received via the connector 426 from a powered device via a wire 470 is passed through the conductive patch 420 to the plurality of fibers of the first fiber ply 404 and the second fiber ply 406 to the conductive layer 408. This arrangement allows the powered device to pass return current to a power source via the conductive layer 408 and through the plurality of fibers of the first fiber ply 404 and the second fiber ply 406 without requiring a conductor separate from the composite member 400 to return current from the powered device to the power source. In an illustrative embodiment, the return current flows through a z-axis 460 direction of the fiber plies 404, 406. The z-axis 460 direction refers to the direction from the conductive patch 420 to the conductive layer 408 (e.g., through a thickness of the composite member 400.

Figure 5:
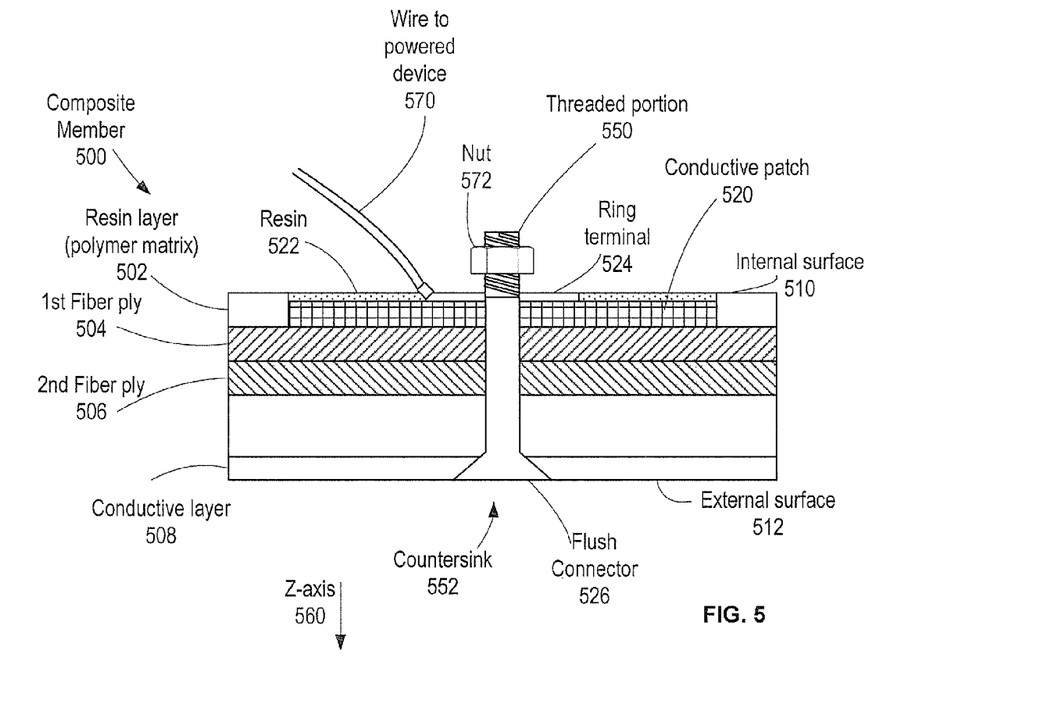
FIG. 5 is an illustration of a third embodiment of a system to distribute power.

FIG. 5 is an illustration of a second embodiment of a system to distribute power. The system illustrated in FIG. 5 includes a composite member 500. In a particular embodiment, the composite member 500 includes a skin or structural member of a vehicle having a composite construction. For example, the composite member 500 may include a panel, a structural member, or a fuselage segment of an aircraft, such as the aircraft 200 of FIG. 2.

The composite member 500 may include a plurality of fibers, such as a first fiber ply 504 and a second fiber ply 506, bound by a polymer matrix. In FIG. 5, the polymer matrix is illustrated as a resin layer 502; however, the polymer matrix may be at a surface or surfaces of the composite member 500, intermixed with the plurality of fibers, at other locations of the composite member 500, or any combination thereof. In a particular embodiment, the polymer matrix is a continuous medium and the fibers of the fiber plies 504, 506 are a discontinuous medium of the composite member 500. In a particular embodiment, the composite member 500 includes a conductive layer 508. For example, the conductive layer 508 may include a lightning protection layer of an aircraft. To illustrate, the composite member 500 may include an internal surface 510 on the inside of the aircraft and an external surface 512 on the outside of the aircraft. The external surface 512 may be covered by a metal conductive layer.

In a particular embodiment, the composite member 500 includes a conductive patch 520 at the internal surface 510. The conductive patch 520 may be electrically bonded to (e.g., in physical contact with) fibers of at least one of the fiber plies 504, 506. For example, the conductive patch 520 may rest on and be in physical contact with at least the first fiber ply 504. Additionally, the conductive patch 520 may be in electrical contact with a flush connector 526. The flush connector 526 may include a hi-lock type fastener with a ring terminal 524 on the inside. The flush connector 526 maybe attached to the composite member 500 via a countersink 552 in the external surface 512 such that the flush connector 526 is substantially flush with the external surface 512.

The conductive patch 520 may be coupled to the composite member 500 via a resin 522. The resin 522 may be applied over the conductive patch 520 to bond the conductive patch 520 to the plurality of fibers of the first fiber ply 504. In a particular embodiment, the conductive patch 520 includes a plurality of holes to allow the resin 522 to contact the first fiber ply 504 while the conductive patch 520 is also in electrical contact with the first fiber ply 504. In a particular embodiment, the conductive patch 520 includes an expanded metal patch. Expanded, in this context, indicates that portions of the conductive patch 520 are separated from one another in a manner that allows the resin 522 to couple to the first fiber ply 504 while the conductive patch 520 is also in contact with the first fiber ply 504. The expanded metal patch may include a metal mesh, metallic cloth, metal foil with a plurality of holes, or other structure that provides holes for the resin 522 to pass through to contact the plurality of fibers of the first fiber ply 504 when the conductive patch 520 is in direct contact with the plurality of fibers of the first fiber ply 504.

In a particular embodiment, the first fiber ply 504 and the second fiber ply 506 include boron fibers, carbon fibers, tungsten fibers or other fibers. The conductive patch 520 may be formed of a material that is galvanically compatible with the plurality of fibers of the fiber plies 504, 506, with the resin layer 502 and with the resin 522. For example, the conductive patch 520 may include copper, nickel, steel, another galvanically compatible metal or alloy, or any combination thereof.

A size of the conductive patch 520 may be selected based on an amount of current to be routed through the conductive patch 520. For example, the size of the conductive patch 520 may be related to a current density of the return current passing through the conductive patch 520 to the fibers of the fiber plies 504, 506. The current density may also be related to a temperature rise that occurs when the return current passes through conductive patch 520 to the fibers of the fiber plies 504, 506. In a particular embodiment, the size of the conductive patch 520 may be selected such that, during operation, a temperature change due to the return electrical current passing through the plurality of fibers of the first fiber ply 504 and the second fiber ply 506 via the conductive patch 520 does not cause a glass transition temperature of the resin layer 502 or of the resin 522 to be exceeded. For example, the size of the conductive patch 520 may be selected such that, during operation, a temperature change due to the return current passing through the plurality of fibers of the first fiber ply 504 and the second fiber ply 506 from the conductive patch 520 is less than about 20 degrees centigrade.

The flush connector 526 may be used to couple a powered device to the conductive patch 520. For example, a threaded portion 550 of the flush connector 526 may receive the ring terminal 524, a nut 572, another device to couple a wire to the powered device 570 to the flush connector 526, or any combination thereof. In a particular embodiment, return current received via the wire 570 from the powered device is passed through the conductive patch 520 to the plurality of fibers of the first fiber ply 504 and the second fiber ply 506 to the conductive layer 508. This arrangement allows the powered device to pass return current to a power source via the conductive layer 508 and through the plurality of fibers of the first fiber ply 504 and the second fiber ply 506 without requiring a conductor separate from the composite member 500 to return current from the powered device to the power source. In an illustrative embodiment, the return current flows through a z-axis 560 direction of the fiber plies 504, 506. The z-axis 560 direction refers to the direction from the conductive patch 520 to the conductive layer 508 (e.g., through a thickness of the composite member 500).

Figure 6:
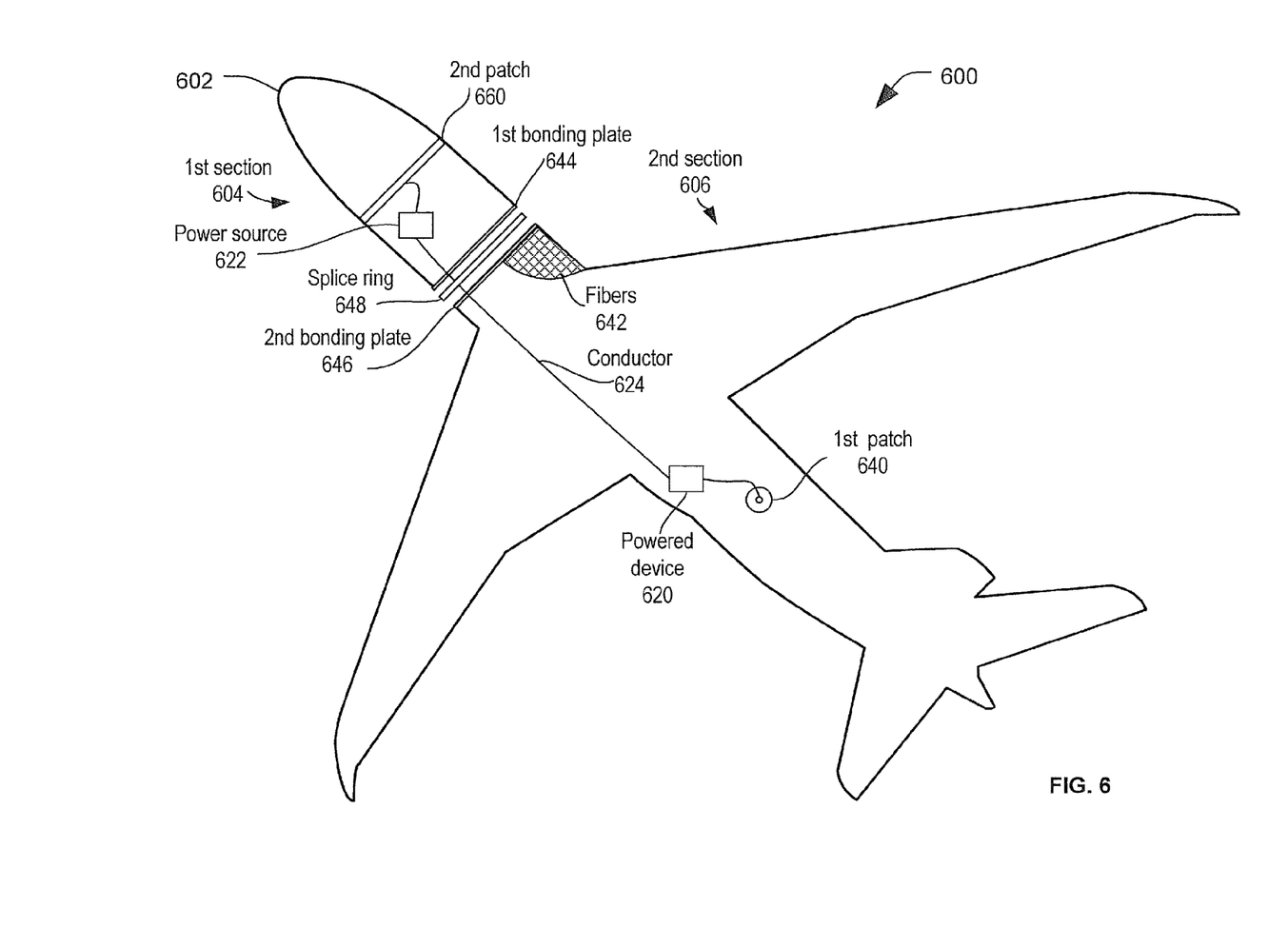
FIG. 6 is an illustration of an aircraft having a composite structure.

FIG. 6 is an illustration of an aircraft 600 having a composite structure. The aircraft 600 is shown partially deconstructed to highlight various components. The aircraft 600 includes a fuselage 602 that includes a plurality of sections, such as a first section 604 and a second section 606. The first section 604 and the second section 606 include composite members. The composite members may be similar to the composite members 310, 400 and 500, discussed with reference to FIG. 3, FIG. 4 and FIG. 5, respectively. For example, the composite member may include a plurality of fibers 642 that are bound together by a resin (not shown in FIG. 6).

In a particular embodiment, the aircraft 600 includes a power source 622 coupled via a conductor 624 (such as a wire) to a powered device 620. The power source 622 and the powered device 620 may be in the same section 604, 606, or in different sections 604, 606. The powered device 620 may be coupled via a first patch 640 to the plurality of fibers 642. In a particular embodiment, the power source 622 supplies current to the powered device 620 via the conductor 624 and the powered device 620 provides return current to the power source 622 via the plurality of fibers 642. For example, the powered device 620 may send the return current via the first patch 640 to the plurality of fibers 642. The power source 622 may be coupled to the plurality of fibers 642 via a second patch 660.

In a particular embodiment, the plurality of fibers 642 of the second section 606 may be coupled to fibers (not shown) of the first section 604 via one or more bonding plates. For example, the first section 604 may include a first bonding plate 644. The first bonding plate 644 may include a conductive patch bonded to the fibers of the first section 604. That is, the first bonding plate 644 may be in electrical contact with the plurality of fibers of the first section 604. Additionally, the second section 606 may include a second bonding plate 646. The second bonding plate 646 may include a conductive patch in electrical contact with the plurality of fibers 642 of the second section 606. A splice ring 648 may electrically couple the first bonding plate 644 to the second bonding plate 646 creating an electrical union between the second section 606 and the first section 604 to enable current to flow from the plurality of fibers 642 of the second section 606 to the fibers of the first section 604.

In a particular embodiment, the first section 604, the second section 606 or other sections of the aircraft 600 may include a lightning protection layer on an outer surface. For example, the lightning protection layer may include a conductive layer, such as the conductive layer 318 described with reference to FIG. 3, the conductive layer 408 described with reference to FIG. 4, or the conductive layer 508 described with reference to FIG. 5. The splice ring 648 may provide an electrical union between the lightning protection layer of the first section 604 and the lightning protection layer of the second section 606 or lightning protection layers of other sections of the aircraft 600. In FIG. 6, the aircraft 600 has been illustrated as having two sections (e.g., the first section 604 and the second section 606); however, the aircraft 600 may include any number of sections. Any two or more of the sections of the aircraft 600 may be electrically coupled via bonding plates and splice rings as illustrated with respect to the first section 604 and the second section 606 to provide electrical contact between fibers of each section, to provide electrical contact between lightning protection layers associated with each section, or both. Thus, current may flow from the power source 622 to powered devices, such as the powered device 620, at any location in the aircraft 600 using a powered wire, such as the conductor 624, without a return conductor. The return current may be provided from the powered device 620 to the power source 622 via the plurality of fibers of the aircraft 600. In a particular embodiment, the return current may pass through the plurality of fibers to the lightning protection layer, and the lightning protection layer may provide an electrical path to communicate the return current to the power source 622.

In a particular embodiment, a size of each of the conductive patches, such as the first patch 640, the second patch 660, the bonding plates 644, 646, or any combination thereof may be selected based on materials used in the aircraft 600. For example, the sizes of the conductive patches 640, 660 and the bonding plates 644, 646 may be selected based on a resin used to bind the fibers 642 in the composite members. In another example, the sizes of the conductive patches 640, 660 and the bonding plates 644, 646 may be selected based on a resin used to bind the conductive patches 640, 660 and the bonding plates 644, 646 to the fibers 642. In an illustrative embodiment, the sizes of the conductive patches 640, 660 and the bonding plates 644, 646 are selected such that a temperature change due to current passing through the fibers via the conductive patches 640, 660 and the bonding plates 644, 646 does not cause a glass transition temperature of a resin to be exceeded. For example, the size of each of the conductive patches 640, 660 and the size of each of the bonding plates 644, 646 may be selected such that a temperature change due to the return current passing through the fibers via the conductive patches 640, 660, and the bonding plates 644, 646 is less than about 20 degrees centigrade.

Figure 7:
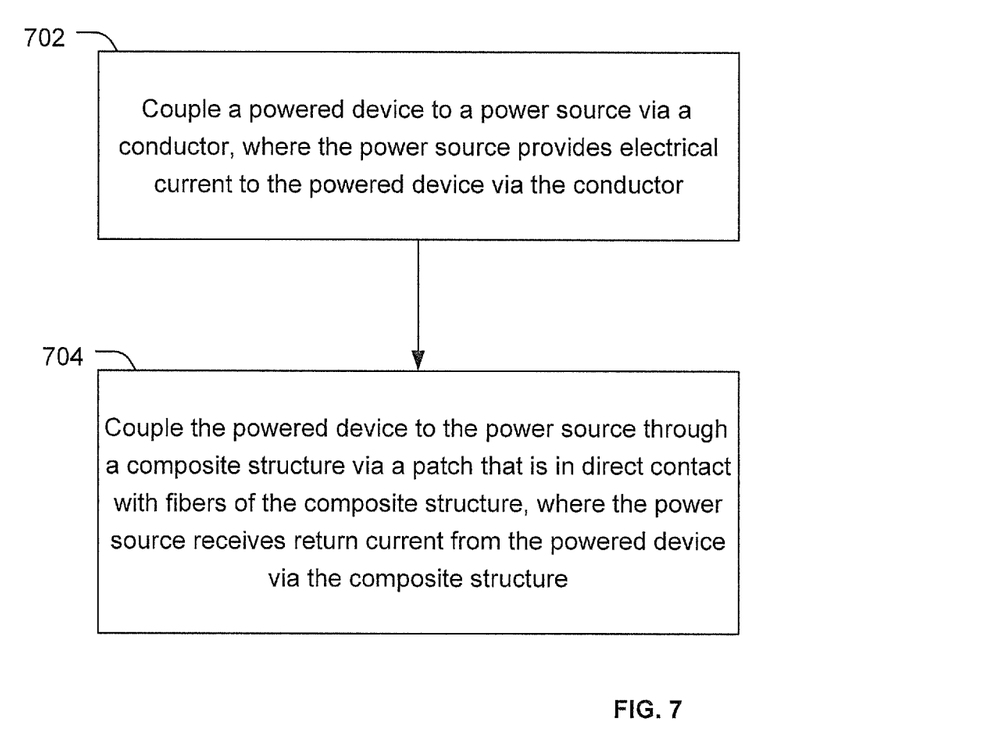
FIG. 7 is flow diagram of a particular embodiment of a method of distributing power in a system having a composite structure.

FIG. 7 is flow diagram of a particular embodiment of a method of distributing power in a system having a composite structure. The method described with reference to FIG. 7 may be used in conjunction with a composite member, such as the composite member 310 described with reference to FIG. 3, the composite member 400 described with reference to FIG. 4, or the composite member 500 described with reference to FIG. 5. Further, the method may be used in conjunction with a system having a composite structure, such as the aircraft 600 discussed with reference to FIG. 6.

The method includes, at 702, coupling a powered device to a power source via a conductor. The power source provides electrical current to the powered device via the conductor. The method includes, at 704, coupling the powered device to the power source through the composite structure via a patch that is in direct contact with fibers of the composite structure. The power source receives return current from the powered device via the composite structure. In a particular embodiment, the composite structure includes a first surface and a second surface. The patch may be coupled to the first surface and a substantially continuous conductive layer may be coupled to the second surface. For example, the first surface may include an interior portion of an aircraft and the second surface may include an exterior portion of the aircraft. To illustrate, the substantially continuous conductive layer may include a lightning protection layer. In a particular embodiment, the return current flows through the fibers of the composite structure to the substantially continuous conductive layer from the powered device to the power source. In another particular embodiment, the return current flows through the fibers of the composite structure from the powered device to the power source.

Figure 8:
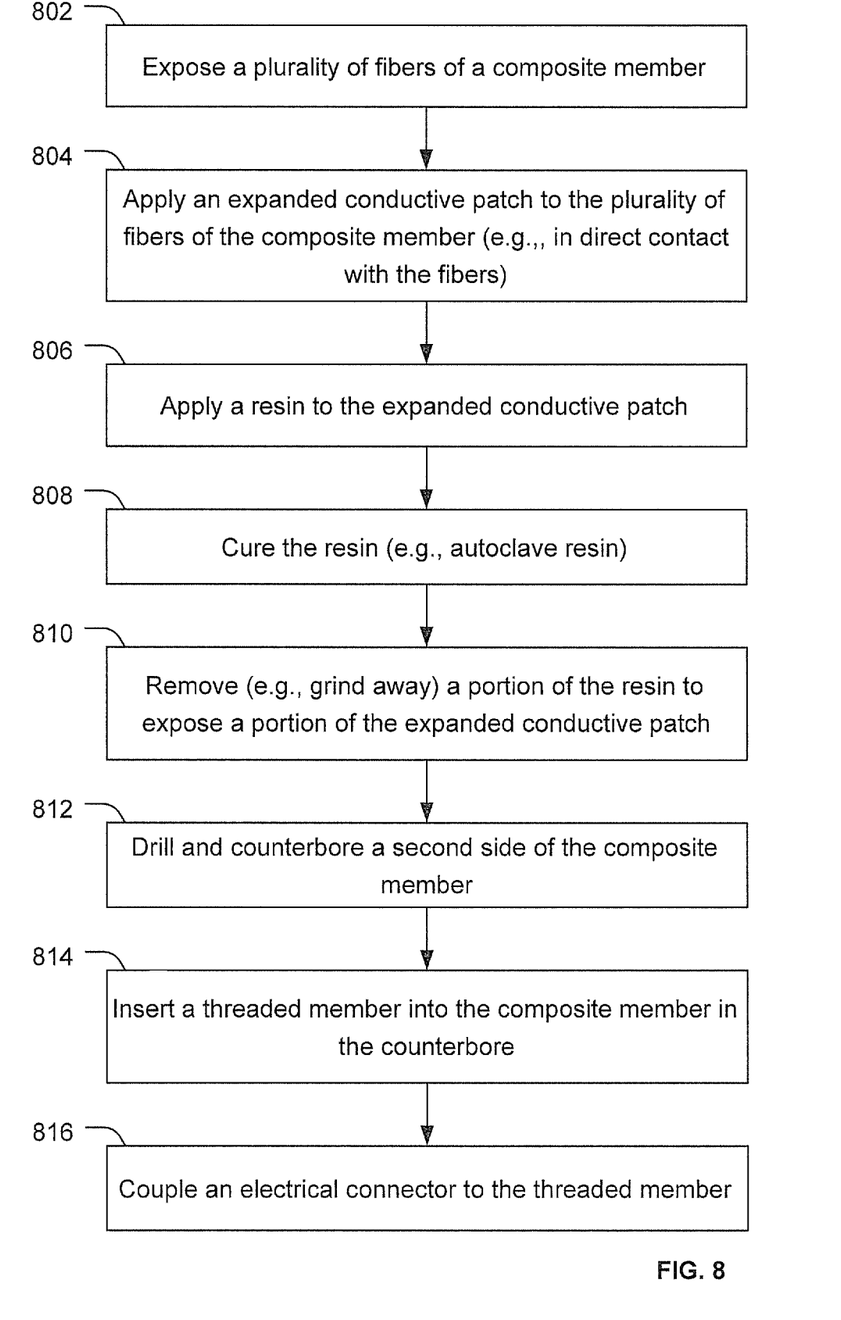
FIG. 8 is a flow diagram of a particular embodiment of a method of making a power distribution system.

FIG. 8 is a flow diagram of a particular embodiment of a method of making a power distribution system. The method described with reference to FIG. 8 may be used in conjunction with a composite member, such as the composite member 310 described with reference to FIG. 3, the composite member 400 described with reference to FIG. 4, or the composite member 500 described with reference to FIG. 5. Further, the method may be used in conjunction with a system having a composite structure, such as the aircraft 600 described with reference to FIG. 6. Additionally, a power distribution system made according to the method described with reference to FIG. 8 may be used to distribute power as discussed with reference to FIG. 7.

The method includes, at 802, exposing a plurality of fibers of a composite member. For example, the composite member may include a plurality of fibers bound by a resin. In this example, the plurality of fibers may be covered by the resin and exposing the plurality of fibers may include grinding away or otherwise removing a portion of the resin to enable direct access to the plurality of fibers.

The method also includes, at 804, applying an expanded conductive patch to the plurality of fibers of the composite member. For example, after exposing the plurality of fibers, the expanded conductive patch may be placed in direct contact with the fibers. The expanded conductive patch may include a conductor that is corrosion resistant and is selected to be galvanically compatible with the composite member. For example, the expanded conductive patch may include copper, nickel, steel, another galvanically compatible metal or alloy, or any combination thereof.

At 806, a resin may be applied to the expanded conductive patch to bond the expanded conductive patch in direct contact with the plurality of fibers. The expanded conductive patch may also be selected to be galvanically compatible with the resin. The resin may be cured, at 808. For example, the composite member may be placed in an autoclave at a specified temperature and pressure to cure the resin. In another example, the expanded conductive patch and the resin may be pressed onto the composite member using a vacuum bag and heated to cure the resin and bond the expanded conductive patch onto the composite member. To illustrate, such a vacuum bag and heating system may be used to apply the expanded conductive patch to an aircraft in service.

At 810, a portion of the resin bonding the expanded conductive patch to the composite member may be removed to expose a portion of the expanded conductive patch. For example, a portion of the resin may be ground away, chemically stripped, peeled away or otherwise removed. At 812, the composite member may be drilled and counterbored on a second side of the composite member, where the second side is opposite a side on which the expanded conductive patch is applied. A threaded member may be inserted into the composite member via the counterbore, at 814. An electrical connector may be coupled to the threaded member through the composite member, at 816. Additionally, in a particular embodiment, a filler putty may be provided to fill the counterbore to smooth the second surface of the composite member.

The conductive patch may provide an electrical path from the electrical connector to the plurality of fibers of the composite member. In a particular embodiment, the electrical connector may be coupled to a powered device to provide return current to a power source via the composite member. For example, the composite member may be a portion of a panel of an aircraft, and the plurality of fibers may be used to provide a return current path to the power source from the powered device via the conductive patch.

A size of the expanded conductive patch may be selected to reduce peak current density by spreading out the return current over an area of the expanded conductive patch. For example, if only a bolt were used to electrically couple the powered device to the fibers, a smaller contact area between the fibers and the bolt would be achieved than the contact area between the expanded conductive patch and the fibers. The smaller contact area results in a higher current density. The current density associated with the bolt may be high enough that a temperature change that results from passing current from the bolt to the fibers becomes undesirable. For example, the temperature may approach a glass transition temperature associated with the composite member. Approaching or exceeding the glass transition temperature may cause the composite member to soften and would be undesirable. By spreading the current out over the expanded conductive patch, the local current density can be reduced, thereby reducing the temperature change associated with the current. To illustrate, an operational temperature of a carbon fiber reinforced polymer resin may be about 72 degrees centigrade. To ensure that the glass transition temperature is not reached, an upper safe temperature rise limit may be set at about 20 degrees centigrade. Accordingly, the expanded conductive patch may be sized such that the temperature change resulting from passing current through the expanded conductive patch is less than about 20 degrees centigrade. Thus, the expanded conductive patch can be used to safely distribute the current over a wide area. Additionally, when a conductive layer is present, the current can be passed through the fibers of the composite member to the conductive layer without undesirable temperature increases.

In a particular embodiment, a similar arrangement to that described above may be used to couple a power source to the composite member or other composite members of the system. Since the power source may be receiving return current from a number of powered devices, an expanded conductive patch used to couple the power source to the composite member may be larger than the expanded conductive patch used to couple each of the powered devices to the composite member. For example, when the composite member is part of an aircraft, the expanded conductive patch used to receive the return current at the power source may include a ring around a section of the fuselage.

In a particular embodiment, the return current can be passed to the lightning protection layer of an aircraft so that the return current can flow back to the power source. Using the expanded conductive patch described herein allows the current to flow to the lightning protection layer in a manner that has an acceptable current density and does not increase drag of the aircraft. For example, the expanded conductive patch can be coupled to an inner surface of the aircraft. Additionally, a coupler to connect a powered device to the expanded conductive patch can be attached to a threaded insert in a counterbore through an exterior surface of the aircraft. Further, a filler putty may be used to cover the counterbore. Thus, the threaded insert does not increase drag significantly, if at all. Because current is passed from the expanded conductive patch to the lightning protection layer, there is no need to precisely install the threaded insert to achieve electrical contact between the threaded insert and the lightning protection layer.

Although the systems and methods to distribute power disclosed above have primarily been discussed in the context of use in an aircraft, the systems and methods are also useful in other areas. For example, the disclosed systems and methods to distribute power may be useful in an environment where power is to be distributed in a system that includes a composite structure. Examples of such systems include, but are not limited to: windmills and other composite power generating devices; automobiles, boats and other vehicles.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be reduced. Accordingly, the disclosure and the figures are to be regarded as illustrative rather than restrictive.

Although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is provided with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, claimed subject matter may be directed to less than all of the features of any of the disclosed embodiments. Thus, the following claims are incorporated into the Detailed Description, with each claim standing on its own as defining separately claimed subject matter.

The above-disclosed subject matter is to be considered illustrative, and not restrictive, and the appended claims are intended to cover all such modifications, enhancements, and other embodiments, which fall within the scope of the present disclosure. Thus, to the maximum extent allowed by law, the scope of the disclosure is to be determined by the broadest permissible interpretation of the following claims and their equivalents, and shall not be restricted or limited by the foregoing detailed description.

What is claimed is:

1. A method comprising:
exposing a plurality of fibers of a composite skin of an aircraft component by providing an opening in a layer of a first resin overlaying the plurality of fibers at an interior surface of the composite skin;
bonding a conductive patch in electrical contact with the plurality of fibers of the composite skin at the opening using a second resin; and preparing the aircraft component to receive a connector in electrical contact with the conductive patch.

2. The method of claim 1, further comprising applying a conductive layer on an external surface of the composite skin.

3. The method of claim 1, wherein a size of the conductive patch is selected such that a temperature change due to electrical current passing through the plurality of fibers via the conductive patch is less than twenty degrees centigrade.

4. The method of claim 1, wherein a size of the conductive patch is selected such that a temperature change due to electrical current passing through the plurality of fibers via the conductive patch does not cause a glass transition temperature of a polymer matrix of the composite skin to be exceeded.

5. The method of claim 1, wherein preparing the aircraft component to receive the connector in electrical contact with the conductive patch includes:
    forming a hole through the composite skin and the conductive patch; and
    inserting a threaded member into the hole, wherein threaded member is configured to receive the connector.

6. The method of claim 5, wherein forming the hole through the composite skin and the conductive patch includes drilling the hole and counterboring the composite skin at an external surface.

7. The method of claim 6, wherein the composite skin includes a conductive layer at the external surface, and further comprising, after the threaded member is inserted into the hole, applying a filler putty between the threaded member and the conductive layer, wherein the filler putty is substantially flush with the conductive layer.

8. A method comprising:
    exposing a plurality of fibers of a first section of a plurality of sections of a composite skin of a fuselage of an aircraft by providing an opening in a layer of a first resin overlaying the plurality of fibers at an interior surface of the first section;
    bonding a conductive patch in electrical contact with the plurality of fibers of the first section using a second resin; and
    preparing the first section to receive a connector in electrical contact with the conductive patch.

9. The method of claim 8, further comprising joining the first section and a second section of the plurality of the sections using a splice ring, wherein the first section and the second section are adjacent sections of the fuselage.

10. The method of claim 9, wherein the fuselage includes a conductive layer at an external surface and wherein the splice ring provides electrical contact between a portion of the conductive layer of the first section and a portion of the conductive layer of the second section.

11. The method of claim 9, wherein the splice ring provides electrical contact between the plurality of fibers of the first section and a plurality of fibers of the second section.

12. The method of claim 11, further comprising:
    applying a first bonding plate in electrical contact with the plurality of fibers of the first section; and
    applying a second bonding plate in electrical contact with the plurality of fibers of the second section, wherein the splice ring electrically couples the first bonding plate and the second bonding plate.

13. The method of claim 8, further comprising:
    coupling the connector in electrical contact with the conductive patch; and
    coupling a powered device of the aircraft to the connector via a first conductor;
    wherein the powered device is configured to receive electrical current from a power source of the aircraft via a second conductor and to return electrical current to the power source via the first conductor and the plurality of fibers.

14. The method of claim 13, wherein an external surface of the fuselage includes a conductive layer, and wherein the electrical current from the powered device passes through the plurality of fibers to the conductive layer.

15. A method comprising:
    coupling a powered device to a power source via a conductor, wherein the power source provides electrical current to the powered device via the conductor; and
    coupling the powered device to the power source through a composite structure, wherein the power source receives return current from the powered device via the composite structure, wherein the composite structure includes a first resin layer overlaying a plurality of fibers, and wherein the powered device is coupled to the composite structure via a conductive patch that is bonded in electrical contact with the plurality of fibers by a second resin at an opening in the first resin layer.

16. The method of claim 15, wherein the composite structure includes a first surface and a second surface, wherein the patch is coupled at least partially within the opening on the first surface and a conductive layer is coupled to the second surface.

17. The method of claim 16, wherein the return current from the powered device passes from the conductive patch through the plurality of fibers to the conductive layer.

18. The method of claim 15, further comprising coupling the powered source to the composite structure via a second conductive patch that is in electrical contact with the plurality of fibers at a second opening in the first resin layer.

19. The method of claim 15, wherein the plurality of fibers includes boron fibers, carbon fibers, tungsten fibers, or a combination thereof.

20. The method of claim 15, wherein the conductive patch is an expanded metal patch.

* * * * *